(12) United States Patent
Koizumi (10) Patent No.: US 11,138,702 B2
(45) Date of Patent: Oct. 5, 2021

(54) INFORMATION PROCESSING APPARATUS, INFORMATION PROCESSING METHOD AND NON-TRANSITORY COMPUTER READABLE STORAGE MEDIUM

(71) Applicant: CANON KABUSHIKI KAISHA, Tokyo (JP)

(72) Inventor: Tatsuro Koizumi, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 16/702,935

(22) Filed: Dec. 4, 2019

(65) Prior Publication Data
US 2020/0193575 A1 Jun. 18, 2020

(30) Foreign Application Priority Data

Dec. 17, 2018 (JP) .............................. JP2018-235667

(51) Int. Cl.
*G06T 5/00* (2006.01)
*G06T 5/50* (2006.01)
*G06T 5/20* (2006.01)

(52) U.S. Cl.
CPC .............. *G06T 5/009* (2013.01); *G06T 5/002* (2013.01); *G06T 5/20* (2013.01); *G06T 5/50* (2013.01); *G06T 2207/10024* (2013.01)

(58) Field of Classification Search
CPC .. G06T 5/009; G06T 5/50; G06T 5/20; G06T 5/002; G06T 3/4038; G06T 3/0081; G06T 2207/10024; G06T 2207/10016; G06T 2207/30196; G06T 2207/30221; G06T 2207/10052; G06T 2207/30244; G06T 2207/10012; G06T 2207/20004; G06T 2207/20088; G06T 2207/20221; G06T 1/0007; G06T 2219/2004; G06T 17/00;
(Continued)

(56) References Cited

U.S. PATENT DOCUMENTS

| 7,084,904 B2* | 8/2006 | Liu ...................... | H04N 5/2628 348/218.1 |
| 7,307,655 B1* | 12/2007 | Okamoto ........... | G06K 9/00791 348/222.1 |
| 7,948,514 B2* | 5/2011 | Sato ...................... | G03B 35/26 348/46 |
| 9,013,559 B2* | 4/2015 | Sumitomo ........... | H04N 13/264 348/50 |

(Continued)

FOREIGN PATENT DOCUMENTS

| JP | 2001-307073 A | 11/2001 |
| JP | 2007-334558 A | 12/2007 |
| JP | 2010-020487 A | 1/2010 |

*Primary Examiner* — Jose L Couso
(74) *Attorney, Agent, or Firm* — Venable LLP (57) ABSTRACT

The information processing apparatus has an image correction unit. The image correction unit has a correction parameter determination unit configured to determine a correction parameter for correcting an image capturing characteristic of image data corresponding to a target viewpoint among a plurality of pieces of image data acquired by capturing an object from a plurality of viewpoints based on an image capturing characteristic of image data of another viewpoint different from the target viewpoint and a pixel value correction unit configured to correct a pixel value of the image data corresponding to the target viewpoint based on the correction parameter. Moreover, the information processing apparatus further has an image composition unit configured to generate composed image data based on the image data whose pixel value has been corrected.

16 Claims, 10 Drawing Sheets

(58) Field of Classification Search
CPC ....... G06T 15/20; G06T 15/205; G06T 19/02; G06T 7/215; G06T 7/254; G06T 7/55; G06T 7/30; G06T 7/50; G06T 7/60; G06T 7/80; G06T 7/285; G06T 7/896; G06T 7/557; G06T 7/593; G06T 7/97; H04N 13/117; H04N 13/239; H04N 13/243; H04N 13/279; H04N 13/282; H04N 13/111; H04N 13/161; H04N 13/211; H04N 13/221; H04N 13/264; H04N 13/296; H04N 13/236; H04N 21/4223; H04N 9/045; H04N 21/04559; H04N 5/23229; H04N 5/23232; H04N 5/247; H04N 5/2258; H04N 5/2254; H04N 5/35563; H04N 5/232; H04N 5/232933; H04N 5/23238; H04N 5/2628; H04N 5/2226; H04N 5/23216; H04N 5/23296; H04N 5/2353; H04N 5/2355; H04N 5/2624; H04N 5/2627; H04N 2213/00–008; H04N 2013/005; H04N 19/597; H04N 2201/3247; G06K 9/3241; G06K 9/00369; G06K 9/4609; G06F 3/005; G06F 3/011; G06F 3/04815
See application file for complete search history.

(56) References Cited

U.S. PATENT DOCUMENTS

| | | | |
|---|---|---|---|
| 9,438,888 B2* | 9/2016 | Venkataraman | G06T 7/557 |
| 9,456,196 B2* | 9/2016 | Kim | H04N 13/161 |
| 2011/0018970 A1* | 1/2011 | Wakabayashi | H04N 13/239 348/47 |
| 2012/0113278 A1* | 5/2012 | Okada | H04N 5/23258 348/208.4 |
| 2012/0242870 A1 | 9/2012 | Koizumi | |
| 2012/0262594 A1 | 10/2012 | Koizumi | |
| 2013/0113892 A1* | 5/2013 | Nakamaru | H04N 13/111 348/47 |
| 2016/0142625 A1* | 5/2016 | Weksler | H04N 5/23222 348/222.1 |
| 2017/0270683 A1* | 9/2017 | Sakamoto | G06T 7/74 |
| 2019/0313020 A1* | 10/2019 | Snyder | H04N 5/23219 |

* cited by examiner

INFORMATION PROCESSING APPARATUS, INFORMATION PROCESSING METHOD AND NON-TRANSITORY COMPUTER READABLE STORAGE MEDIUM

BACKGROUND

Field

The present disclosure relates to a technique to generate composed image data from a plurality of pieces of image data acquired by capturing an object from a plurality of viewpoints.

Description of the Related Art

A technique is known, which composes virtual viewpoint image data obtained in a case where an object is viewed from an arbitrary virtual viewpoint from a plurality of pieces of image data acquired by capturing the object by a plurality of image capturing apparatus (from a plurality of viewpoints). For example, Japanese Patent Laid-Open No. 2010-20487 has disclosed the following method. First, by using image data of an object captured by a plurality of image capturing apparatuses and position information on the image capturing apparatuses, an object shape is estimated. Next, virtual viewpoint image data is composed by mapping the captured image data as texture image data onto the estimated object shape.

Further, a technique is known, which composes panorama image data from a plurality of pieces of image data acquired by capturing the surrounding landscape. Japanese Patent Laid-Open No. 2007-334558 has disclosed a technique to compose panorama image data by connecting image data of a plurality of viewpoints captured by performing image capturing by changing the image capturing direction.

As described above, in a case where composed image data, such as virtual viewpoint image data and panorama image data, is generated from a plurality of pieces of image data based on image capturing from a plurality of viewpoints, there is a case where a difference in brightness and tint arises between image data. In such a case, a change in brightness and tint occurs also in composed image data, and therefore, image quality is reduced. In Japanese Patent Laid-Open No. 2010-20487, by composing texture image data by using image data captured from the vicinity of a virtual viewpoint, such a reduction in image quality is suppressed. Further, in Japanese Patent Laid-Open No. 2007-334558, such a reduction in image quality is suppressed by correcting image data so that a difference in brightness between image data becomes slight. However, even by using the techniques described in Japanese Patent Laid-Open No. 2010-20487 and Japanese Patent Laid-Open No. 2007-334558, it is not possible to sufficiently suppress a reduction in image quality of the composed image data.

An object of the present disclosure is to suppress a reduction in image quality of the composed image data generated from a plurality of pieces of image data based on image capturing from a plurality of viewpoints.

SUMMARY

In one embodiment of the present disclosure, the information processing apparatus has: a determination unit configured to determine a correction parameter for correcting an image capturing characteristic of image data corresponding to a target viewpoint among a plurality of pieces of image data acquired by capturing an object from a plurality of viewpoints based on an image capturing characteristic of image data of another viewpoint different from the target viewpoint; a correction unit configured to correct a pixel value of the image data corresponding to the target viewpoint based on the correction parameter; and a generation unit configured to generate composed image data based on the image data whose pixel value has been corrected.

Further features of the present disclosure will become apparent from the following description of exemplary embodiments with reference to the attached drawings.

DESCRIPTION OF THE EMBODIMENTS

In the following, with reference to the drawings, embodiments of the present disclosure are explained in detail. The following embodiments are not intended to limit the present disclosure. Further, all combinations of features explained in the present embodiments are not necessarily indispensable to the present disclosure. The same configuration is explained by attaching the same symbol.

First Embodiment

Figure 1A:
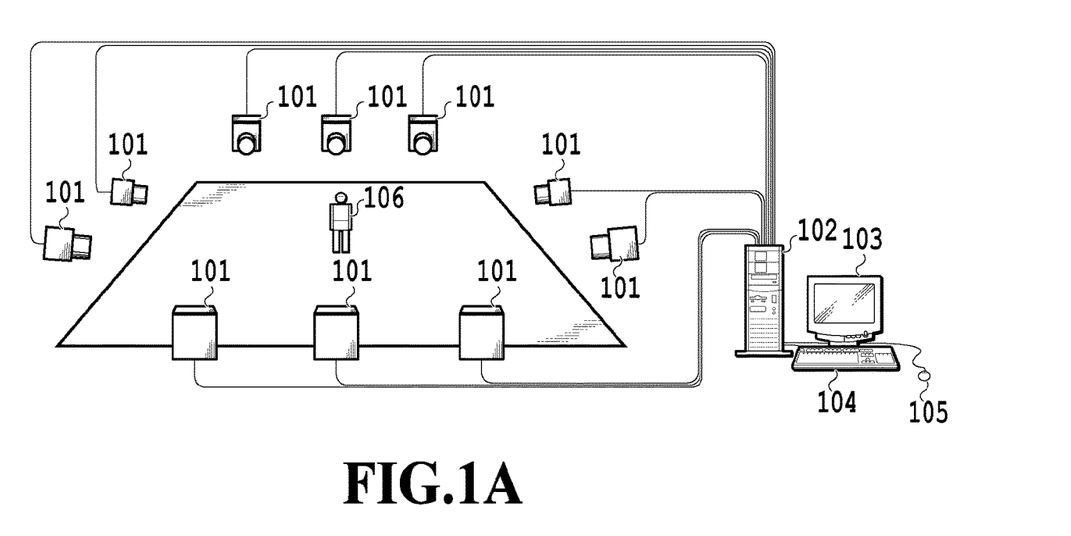
FIG. 1A and FIG. 1B are each a schematic diagram showing an example of a configuration of an image capturing system in a first embodiment.
Figure 1B:
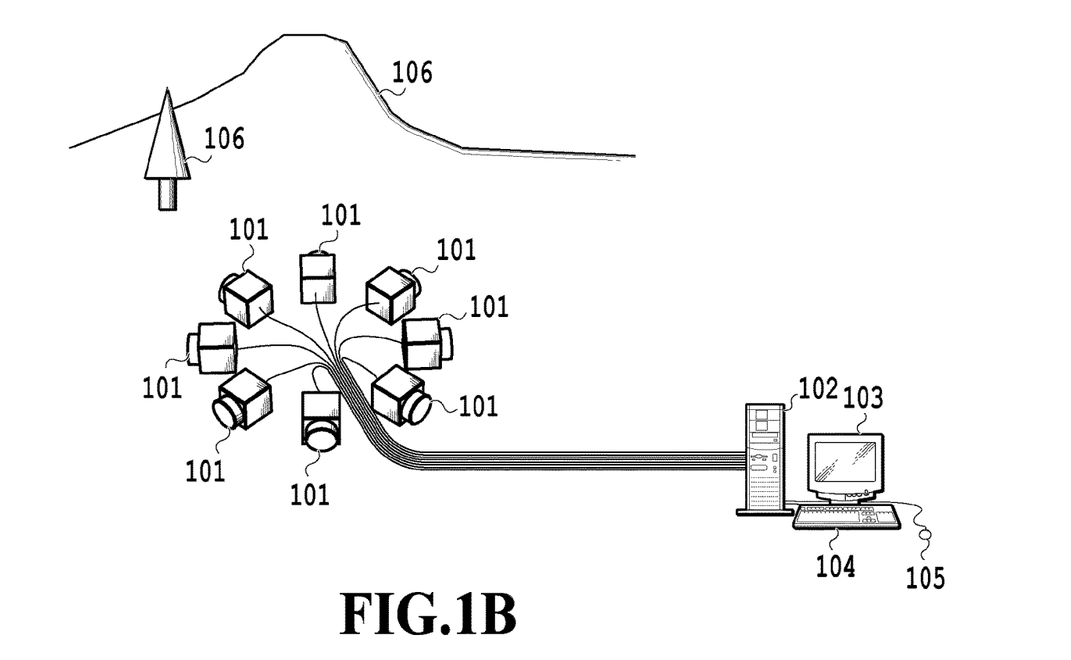

FIG. 1A and FIG. 1B are each a schematic diagram showing an example of a configuration of an image capturing system in the present embodiment. The image capturing system in the present embodiment has a plurality of image capturing apparatuses 101, an image processing apparatus 102, a display device 103, and input devices 104 and 105.

FIG. 1A shows an example of an image capturing system that acquires image data by performing image capturing by the plurality of the image capturing apparatuses 101 arranged so as to surround an object 106 and generates virtual viewpoint image data in the image processing apparatus 102, the virtual viewpoint image data being data obtained in a case where image capturing is performed from an arbitrary virtual viewpoint. In the image capturing system in FIG. 1A, by using a method, such as the visual volume intersection method disclosed in Japanese Patent Laid-Open No. 2001-307073, the three-dimensional shape of an object is estimated from the captured image data. Further, by using a method, such as the method disclosed in Japanese Patent Laid-Open No. 2010-20487, virtual viewpoint image data is generated by pasting the captured image data onto the shape of the object as texture.

FIG. 1B shows an example of an image capturing system that acquires image data by capturing the object 106 by the plurality of the image capturing apparatuses 101 arranged so as to perform image capturing toward all directions of the object 106 that exists around and generates panorama image data in all directions in the image processing apparatus 102. In the image capturing system in FIG. 1B, panorama image data in all directions is composed by projecting the acquired image data onto a cylinder and connecting the image data by using the method as disclosed in Japanese Patent Laid-Open No. 2007-334558.

To the image processing apparatus 102, the display device 103 and the input devices 104 and 105 are connected. It is possible for a user to set an image capturing condition by operating the input devices 104 and 105 and check processing results of image data on the display device 103.

The number of image capturing apparatuses 101 and arrangement thereof shown schematically are an example and an arbitrary configuration may be accepted as long as the image capturing system is one in which composed image data is generated from image data acquired by capturing an object from a plurality of viewpoints. Further, the method of generating composed image data may be an arbitrary method as long as the method is one in which composed image data is generated by composing image data acquired by capturing an object from a plurality of viewpoints.

Figure 2A:
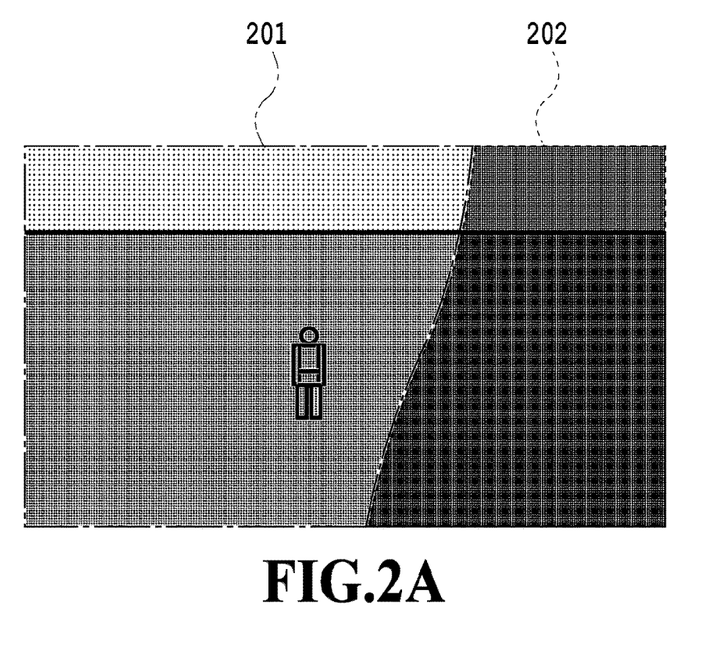
FIG. 2A and FIG. 2B are each a diagram showing an example of composed image data generated by a conventional method.
Figure 2B:
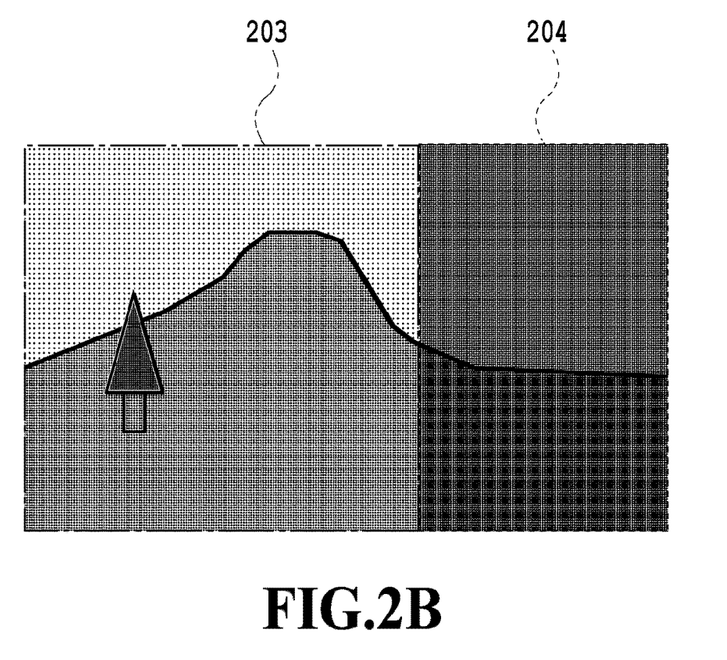

FIG. 2A and FIG. 2B each show an example of composed image data generated by a conventional method.

FIG. 2A shows an example of virtual viewpoint image data generated by capturing an object by a plurality of image capturing apparatuses arranged as in FIG. 1A. The virtual viewpoint image data is generated by pasting the captured image data onto the shape data of an object estimated from the captured image data as texture. In a case of pasting of the captured image data, due to a shield between objects and a restriction on a visual field of each image capturing apparatus, image data of the image capturing apparatus different depending on the area is pasted. In an area 201 of the virtual viewpoint image data, the image data captured by an image capturing apparatus A is pasted and in an area 202, the image data captured by an image capturing apparatus B is pasted. In a case where the brightness of the image data captured by the image capturing apparatus A and the brightness of the image data captured by the image capturing apparatus B are different due to a difference in exposure or an individual difference between the image capturing apparatuses, the brightness of the area 201 and the brightness of the area 202 are different. Because of this, an unnatural change in brightness arises at the boundary between the area 201 and the area 202. As above, in a case where the conventional method is used, the image quality of the virtual viewpoint image data is reduced.

FIG. 2B shows an example of panorama image data generated by capturing an object by the image capturing apparatuses arranged as in FIG. 1B. The panorama image data is generated by pasting image data onto a cylinder or a spherical surface at infinity. In an area 203 of the panorama image data, the image data captured by the image capturing apparatus A is pasted and in an area 204, the image data captured by the image capturing apparatus B is pasted. In a case where the brightness of the image data captured by the image capturing apparatus A and the brightness of the image data captured by the image capturing apparatus B are different due to a difference in exposure or an individual difference between the image capturing apparatuses, the brightness of the area 203 and the brightness of the area 204 are different. Because of this, as in the case with the virtual viewpoint image data, an unnatural change in brightness arises at the boundary between the area 203 and the area 204 and the image quality of the panorama image data is reduced.

The reduction in image quality as described above is caused because the brightness of the plurality of pieces of image data used for generation of composed image data is different. The simplest solution to this problem is to adjust brightness so that the brightness of all the pieces of the image data is equal, but with the method such as this, there is a case where overexposure or shadow-detail loss occurs on a condition that the range of brightness of an object is largely different. Further, in a case where already-captured image data is taken as an input, it is difficult to calculate or adjust the accurate brightness. In the virtual viewpoint image data and the panorama image data, which are composed based on the image data acquired from the image capturing apparatuses (viewpoints) arranged as in FIG. 1A and FIG. 1B, the image data of the viewpoints adjacent to each other is pasted in the adjacent areas. In the present embodiment, by correcting the image data so that a variation in brightness between image data of the viewpoints adjacent to each other is smooth, a reduction in image quality of the composed image data is suppressed.

Figure 3A:
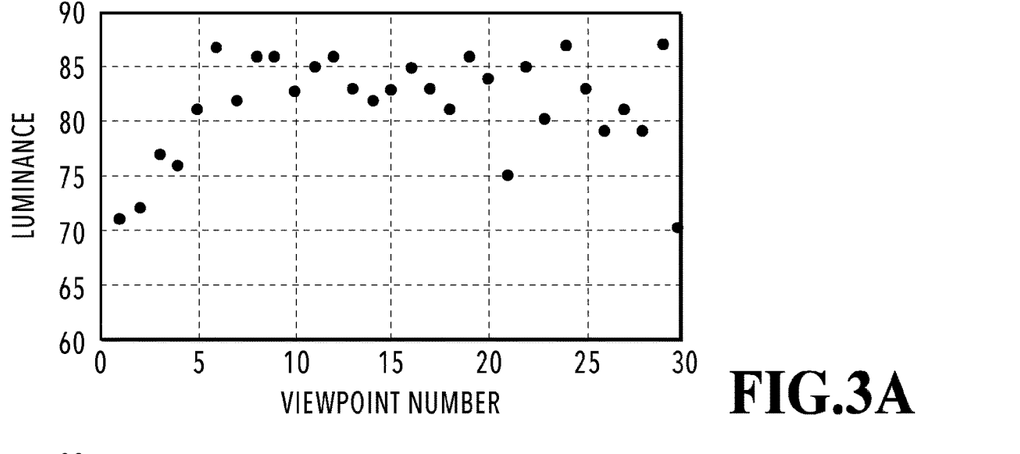
FIG. 3A to FIG. 3C are each a graph representing a relationship between a plurality of viewpoints and a representative value of luminance or a correction amount.
Figure 3B:
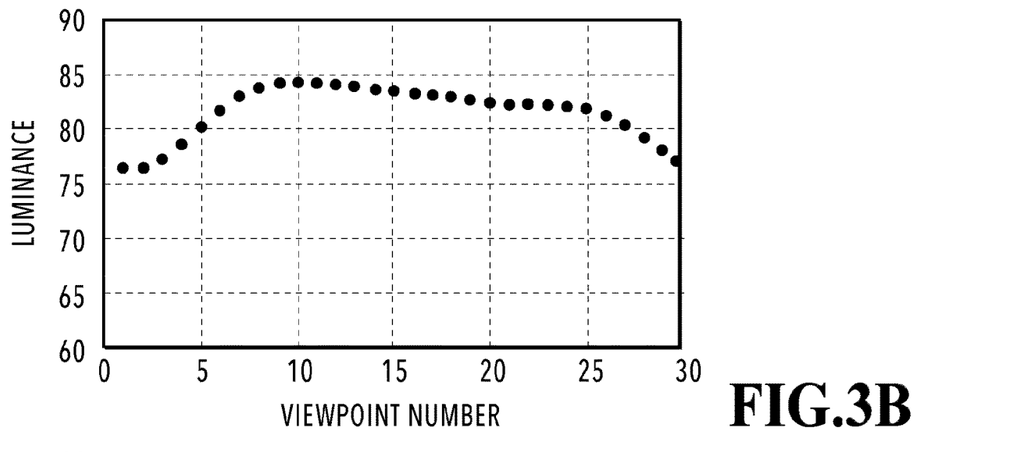
Figure 3C:
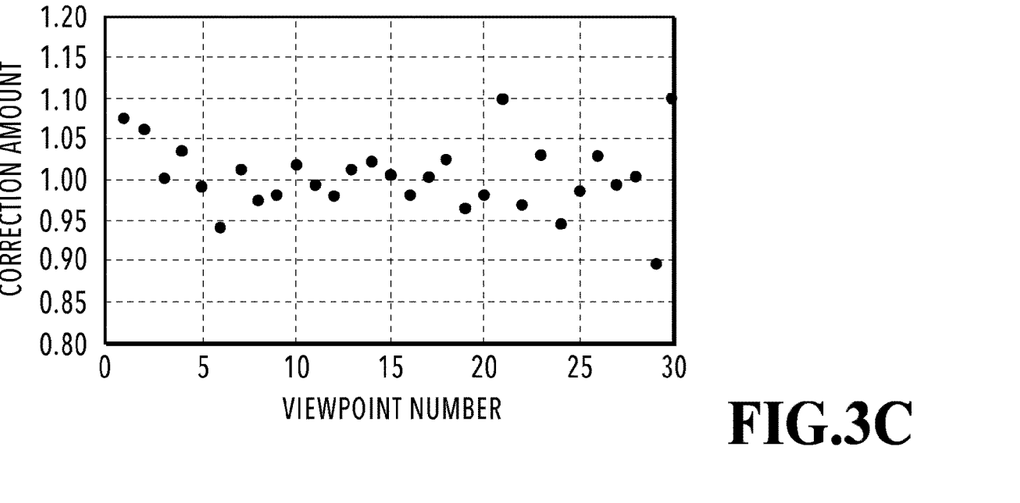

Next, correction processing of image data in the present embodiment is explained. FIG. 3A to FIG. 3C are each a graph representing a relationship between a plurality of viewpoints and a representative value of luminance or a correction amount.

FIG. 3A shows a graph obtained by plotting the representative value of luminance of each piece of image data of 30 viewpoints in order of the viewpoint number. Here, the luminance indicates the brightness of the image data calculated from the exposure at the time of image capturing or the image data. Further, the viewpoints (that is, image capturing apparatuses) are placed in order from a virtual viewpoint located at an arbitrary position and a viewpoint number is allocated to each of the viewpoints. In FIG. 3A, the luminance varies between adjacent viewpoints, and therefore, a reduction in image quality of the composed image data occurs. In the present embodiment, by applying a viewpoint-series low-pass filter to the representative value of luminance of each piece of image data, the representative value of luminance is corrected. As in FIG. 3A, in a case where points are plotted by taking the horizontal axis as the viewpoint number and the vertical axis as the representative value of luminance, it is possible to regard this as a one-dimensional signal. The signal such as this is referred to as a viewpoint series.

FIG. 3B shows a graph obtained by plotting the representative value of luminance after the low-pass filter is applied to each piece of image data shown in FIG. 3A in order of the viewpoint number. In a case where the variation in luminance is an aspect in which the pixel value of each pixel is multiplied by a constant, a correction amount (correction coefficient) is obtained by dividing the representative value of luminance after the correction, which is obtained by applying a low-pass filter, by the representative value of luminance before the correction. In a case where the representative value of luminance before the correction of the nth viewpoint is taken to be $Y_n$ and the low-pass filter to be F, a correction amount $C_n$ of the nth viewpoint is calculated by equation (1).

$$C_n = \frac{Y_n * F}{Y_n} \quad (1)$$

Here, * indicates a circular convolution. Further, as the low-pass filter F, it is possible to use a one-dimensional Gaussian filter or an average filter.

FIG. 3C shows a graph obtained by plotting the correction amount $C_n$ in order of the viewpoint number, which is calculated for the representative value of luminance of each piece of image data of the 30 viewpoints shown in FIG. 3A. By performing correction by multiplying the pixel value of each pixel in each piece of image data by the correction amount $C_n$ thus calculated, the change in luminance between image data is smoothed and the reduction in image quality of the composed image data is suppressed.

Figure 4:
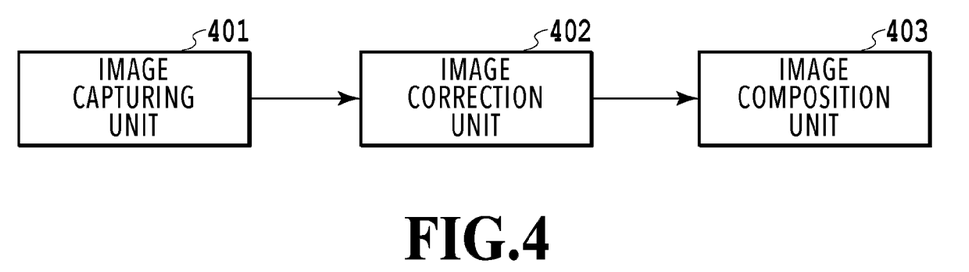
FIG. 4 is a diagram showing an example of a function configuration of an image processing apparatus in the first embodiment.

FIG. 4 is a block diagram showing one example of the function configuration of the image processing apparatus 102 in the present embodiment. The image processing apparatus 102 has an image capturing unit 401, an image correction unit 402, and an image composition unit 403.

The image capturing unit 401 captures an object by a plurality of the image capturing apparatuses 101 and acquires a plurality of pieces of image data. The plurality of the image capturing apparatuses 101 is arranged in order as in FIG. 1A and FIG. 1B. The plurality of the image capturing apparatuses 101 means a plurality of viewpoints.

The image correction unit 402 corrects the variation in the image capturing characteristic between image data and generates corrected image data. The image capturing characteristic means the representative value of luminance of image data. The representative value of luminance of image data is, for example, an intermediate value of the luminance value in the image data, which is calculated from the luminance value of each pixel included in the image data. More detailed processing and configuration of the image correction unit 402 will be described later.

The image composition unit 403 generates composed image data, such as virtual viewpoint image data and panorama image data, based on a plurality of pieces of corrected image data. For the generation processing of composed image data, the method described previously in explanation of the configuration of the image capturing system is used.

As above, the image processing apparatus 102 in the present embodiment performs an information processing method of generating composed image data by using a plurality of pieces of image data acquired by capturing an object from a plurality of viewpoints by the above-described components. That is, the image processing apparatus 102 in the present embodiment is an information processing apparatus that generates composed image data by using a plurality of pieces of image data acquired by capturing an object from a plurality of viewpoints.

Figure 5:
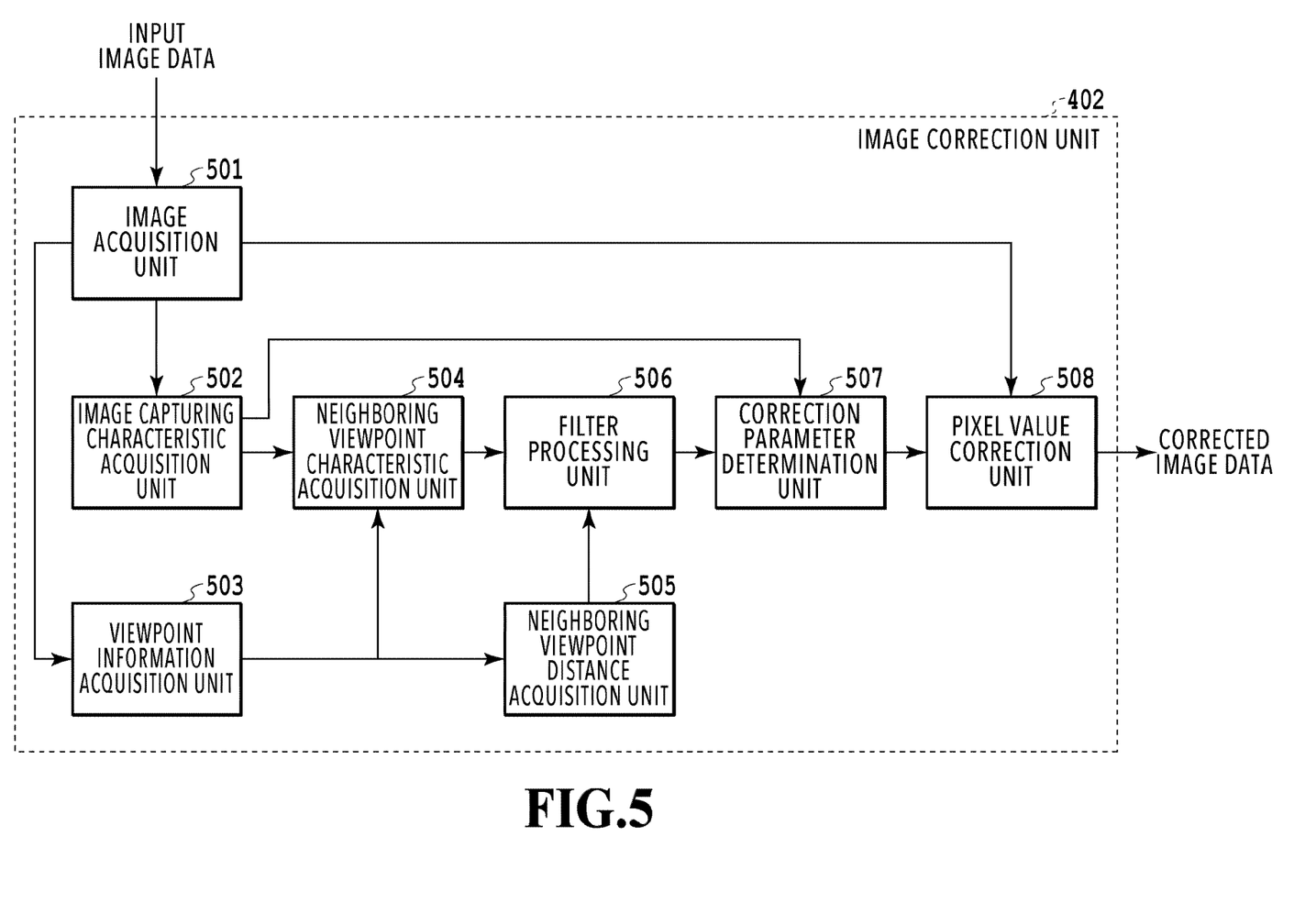
FIG. 5 is a diagram showing an example of a function configuration of an image correction unit in the first embodiment.

FIG. 5 is a block diagram showing one example of the function configuration of the image correction unit 402 in the present embodiment. The image correction unit 402 has an image acquisition unit 501, an image capturing characteristic acquisition unit 502, a viewpoint information acquisition unit 503, a neighboring viewpoint characteristic acquisition unit 504, a neighboring viewpoint distance acquisition unit 505, a filter processing unit 506, a correction parameter determination unit 507, and a pixel value correction unit 508. The processing by each function unit will be described in detail with reference to a flowchart, to be described later.

Figure 6:
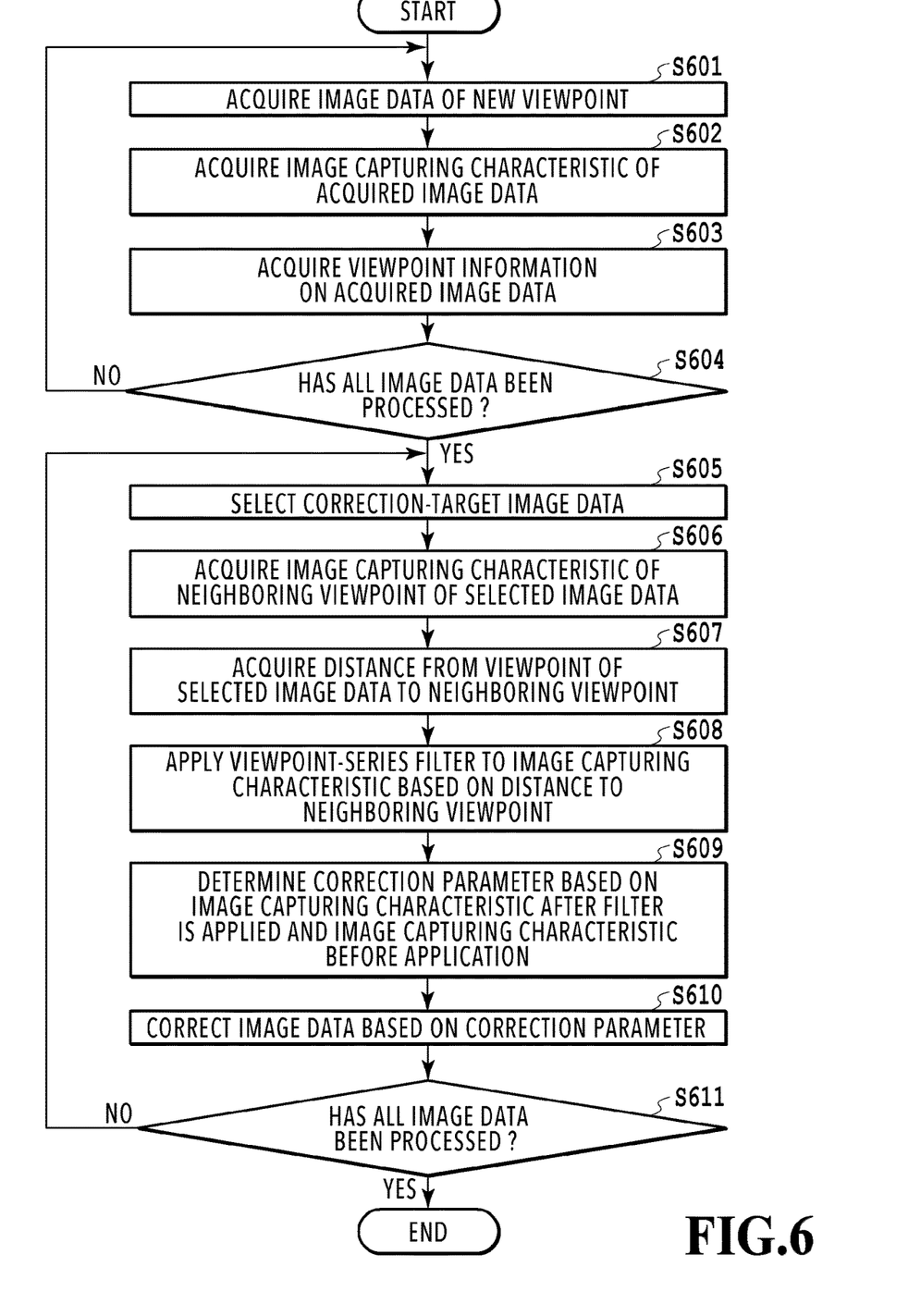
FIG. 6 is a flowchart of image correction processing by the image correction unit of the first embodiment.

FIG. 6 shows a flowchart of image correction processing by the image correction unit 402 of the present embodiment. The series of processing shown in the flowchart is performed by the CPU of the image processing apparatus 102 loading a program code stored in the ROM onto the RAM and executing the program code. Alternatively, it may also be possible to implement part or all of the functions at the steps in the flowchart by hardware, such as an ASIC and an electronic circuit. Symbol "S" in explanation of each piece of processing means a step in the flowchart. This is also true with other flowcharts, to be described later.

First, at S601, the image acquisition unit 501 acquires image data of a new viewpoint from the image capturing unit 401.

At S602, the image capturing characteristic acquisition unit 502 acquires the image capturing characteristic of the image data acquired at S601. The image capturing characteristic is the representative value of luminance of the image data and here, the intermediate value of the luminance value in the image data, which is calculated from the luminance value of each pixel included in the image data.

At S603, the viewpoint information acquisition unit 503 acquires viewpoint information on the image data acquired at S601. The viewpoint information is information relating to arrangement of viewpoints of each piece of image data and here, indicates an arrangement order (that is, viewpoint number) of the viewpoints arranged so as to circulate. The viewpoint number is allocated in order from a viewpoint located at an arbitrary position and stored in association with each piece of image data. The arrangement in which the viewpoints circulate means that a plurality of image capturing apparatuses is arranged all around an object as shown in FIG. 1A or is arranged toward all direction of an object that exits around as shown in FIG. 1B.

At S604, whether the image acquisition unit 501 has processed all the image data. In a case where the processing of all the image data has not been completed yet, the processing returns to S601 and the processing is repeated for the image data of a new viewpoint. In a case where the processing of all the image data has been completed, the processing advances to S605. That is, the processing at S601 to S603 is repeated until all the image data and the image capturing characteristic of and the viewpoint information on each piece of image data are acquired.

At S605, the neighboring viewpoint characteristic acquisition unit 504 selects correction-target image data in accordance with the viewpoint information from all the acquired image data. The neighboring viewpoint characteristic acquisition unit 504 selects correction-target image data (that is, image data of a target viewpoint, which is the processing target) in order from the image data whose viewpoint number is the first.

At S606, the neighboring viewpoint characteristic acquisition unit 504 acquires the image capturing characteristic of the neighboring viewpoint based on the viewpoint information on the selected correction-target image data. Here, the neighboring viewpoint refers to a viewpoint whose distance from the viewpoint of the selected image data is smaller than a threshold value. That is, the neighboring viewpoint characteristic acquisition unit 504 acquires, as the image capturing characteristic of the neighboring viewpoint, the image capturing characteristic of the image data of the viewpoint whose distance from the viewpoint of the selected image data is small. The distance means a difference between viewpoint numbers. For example, a difference between viewpoint number 1 and viewpoint number 2 is |2−1|=1 and this is the distance. Further, in a case where the maximum value of the viewpoint number is 10, the distance between viewpoint number 10 and viewpoint number 1 is given as 1. The reason is that the viewpoints are adjacent to each other on the circumference.

At S607, the neighboring viewpoint distance acquisition unit 505 acquires the distance from the viewpoint (correction-target viewpoint) of the selected correction-target image data to the neighboring viewpoint. Here, the distance means a difference between viewpoint numbers as described above.

At S608, the filter processing unit 506 applies a viewpoint-series low-pass filter to the image capturing characteristic of the correction-target viewpoint by using the image capturing characteristic of the neighboring viewpoint based on the distance from the correction-target viewpoint to the neighboring viewpoint. That is, the filter processing unit 506 performs smoothing processing to perform smoothing between the image capturing characteristic of the image data of the target viewpoint and the image capturing characteristic of the image data of the neighboring viewpoint. As the low-pass filter, a Gaussian filter whose weight (coefficient) is determined by the distance from the correction-target viewpoint to the neighboring viewpoint. A weight w of the Gaussian filter is calculated by using a distance d by equation (2) below.

$$w = C_{exp}(-d^2/2\sigma^2) \qquad (2)$$

Here, $C_{exp}$ is a constant for normalizing the total sum of the Gaussian filter to 1 and σ is an arbitrary parameter (for example, σ=1).

At S609, the correction parameter determination unit 507 determines the correction parameter based on the image capturing characteristic after application of the low-pass filter and the image capturing characteristic before application. It is possible for the correction parameter determination unit 507 to calculate the correction parameter (correction amount) as equation (1). That is, the correction parameter determination unit 507 functions as a correction parameter calculation unit.

At S610, the pixel value correction unit 508 corrects the pixel value of each pixel of the correction-target image data based on the correction parameter. That is, the pixel value of each pixel of the image data is multiplied by the correction parameter.

At S611, whether the neighboring viewpoint characteristic acquisition unit 504 has processed all the image data is determined. In a case where the processing of all the image data has not been completed yet, the processing returns to S605 and the processing is repeated for the image data that is a new correction target. In a case where the processing of all the image data has been completed, the image correction processing is terminated.

In the present embodiment, the representative value of luminance of image data is used as the image capturing characteristic, but any representative value may be the target as long as the characteristic is such that correction can be performed for each piece of image data. For example, it may also be possible to use the representative value of the pixel value for each channel of a color image in place of luminance. Further, it may also be possible to use the white pixel value, which is a reference at the time of correction of white balance, or color temperature as the image capturing characteristic.

Further, in the present embodiment, the intermediate value of luminance of each pixel of the image data is taken to be the representative value, but for example, it may also be possible to use the mode or the average value as the representative value. Further, in a case where it is possible to acquire a parameter, such as exposure at the time of capturing image data, the parameter may be used.

Furthermore, in the present embodiment, as the low-pass filter, the Gaussian filter is used, but any filter may be used as long as the filter has a function to suppress a slight change in the image capturing characteristic. For example, it may also be possible to use an average filter or a fitting for a linear sum of low-frequency bases. Further, as the distance for determining a weight of a filter, it may also be possible to use the position of the viewpoint or the distance between orientations in place of the viewpoint number. For example, it is possible to define the distance (degree of difference) based on the inner product of vectors by using the vectors, which are orientations of the viewpoints. In a case where the inner product is taken to be p and the "distance" is defined as (1−p)*0.5, the "distance" between viewpoints facing in the same direction is 0 and the "distance" between viewpoints facing in the opposite directions is 1.

Further, the correction amount of the present embodiment is calculated as the coefficient (that is, correction coefficient) by which the image data is multiplied, but it may also be to calculate the correction amount as a bias to be added or linear or nonlinear transformation using a plurality of parameters. The "bias to be added" means performing correction by adding a numerical value to a pixel value. "Nonlinear transformation" is, for example, gamma correction.

As explained above, according to the present embodiment, in a plurality of pieces of image data obtained by capturing an object from a plurality of viewpoints, it is possible to suppress the variation in the image capturing characteristic (that is, brightness or tint) between image data and smooth the image capturing characteristic. By doing so, it is possible to suppress a reduction in image quality of composed image data generated from a plurality of pieces of image data based on image capturing from a plurality of viewpoints.

Second Embodiment

In the first embodiment, the configuration is described in which captured image data is corrected by image correction processing. In the present embodiment, a configuration is described in which an image capturing parameter of the image capturing apparatus is corrected based on captured image data. The image capturing parameter means a parameter determining exposure or white balance of the image capturing apparatus. In the present embodiment, by acquiring image data anew after correcting the image capturing parameter of the image capturing apparatus, a reduction in image quality of composed image data is suppressed.

Figure 7:
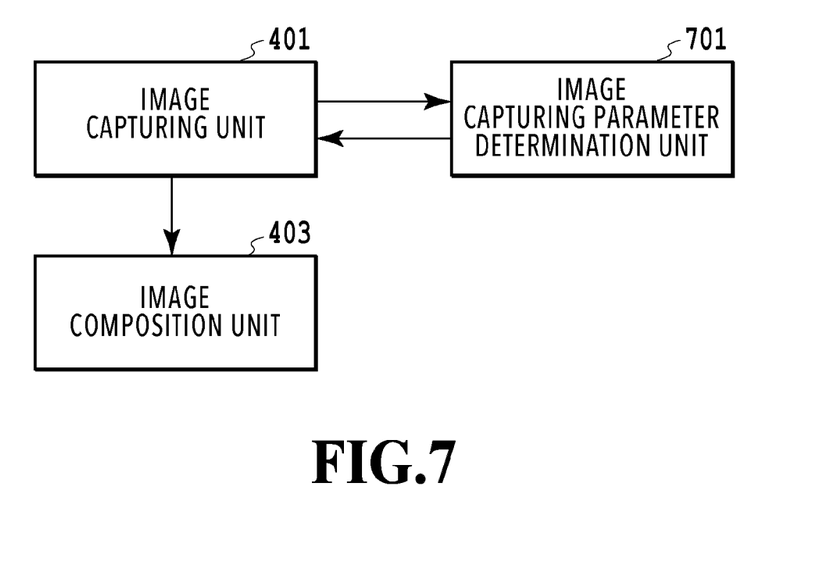
FIG. 7 is a diagram showing an example of a function configuration of an image processing apparatus in a second embodiment.

FIG. 7 is a block diagram showing an example of a function configuration of the image processing apparatus 102 in the present embodiment. The image processing apparatus 102 of the present embodiment has an image capturing parameter determination unit 701 in place of the image correction unit 402 in the first embodiment.

The image capturing parameter determination unit 701 calculates the correction amount by the same method as that of the first embodiment and determines an image capturing parameter based on the correction amount. For example, in a case where the image capturing parameter is one relating to white balance, the image capturing parameter determination unit 701 similarly determines the image capturing parameter for each of the R, and B channels. Hereinafter, the image capturing parameter determined by the image capturing parameter determination unit 701 is also referred to as the image capturing parameter after correction. The image capturing parameter determination unit 701 sends the image capturing parameter after correction to the image capturing unit 401. The image capturing unit 401 acquires image data in which a change in the image capturing characteristic for each viewpoint is suppressed by using the image capturing parameter after correction. The image composition unit 403 generates a composed image by using the image data captured based on the image capturing parameter after correction.

As described above, the image processing apparatus 102 in the present embodiment also performs the information processing method of generating composed image data by using a plurality of pieces of image data acquired by capturing an object from a plurality of viewpoints by the above-described components. That is, the image processing apparatus 102 in the present embodiment is also an information processing apparatus that generates composed image data by using a plurality of pieces of image data acquired by capturing an object from a plurality of viewpoints.

Figure 8:
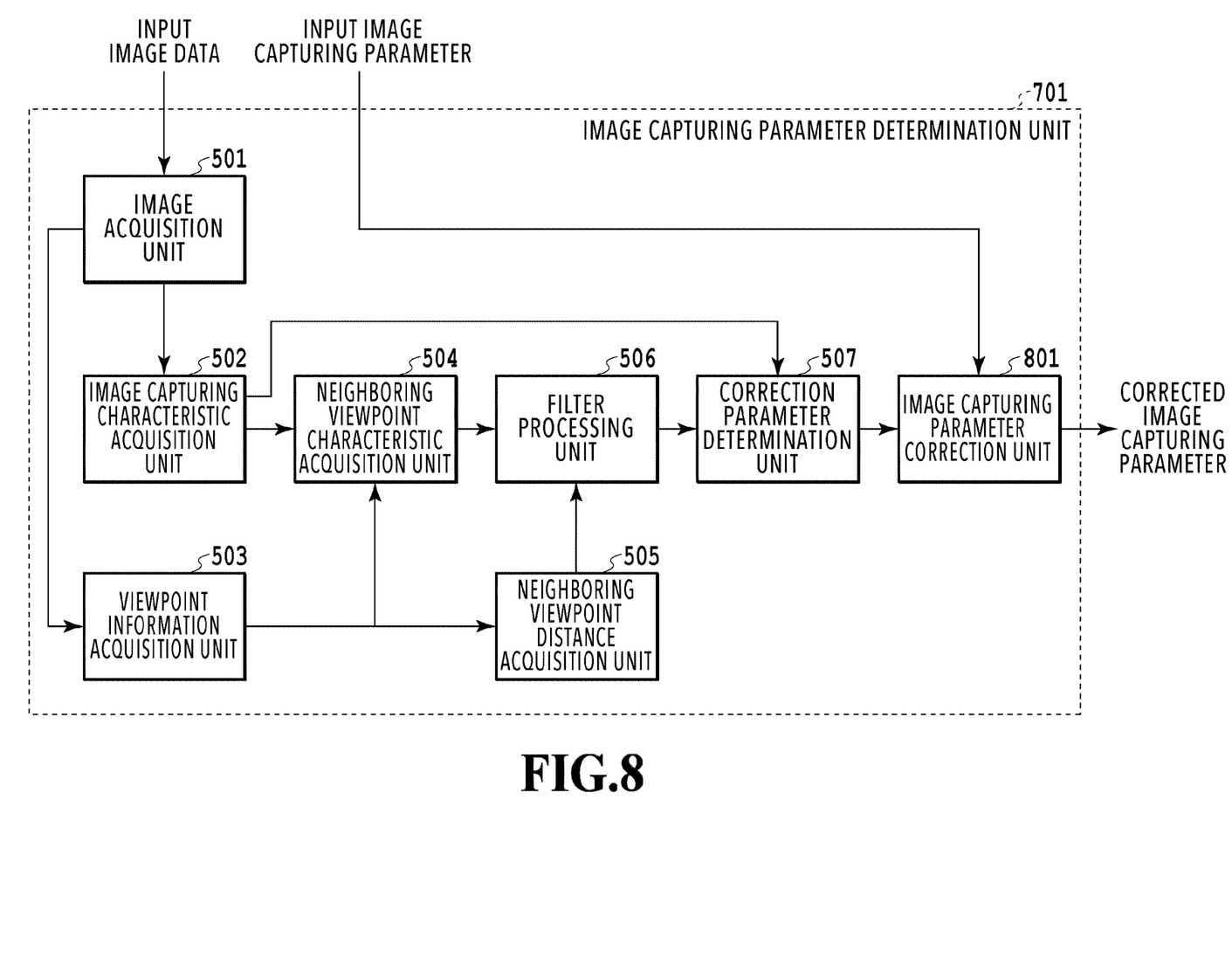
FIG. 8 is a diagram showing an example of a function configuration of an image capturing parameter determination unit of the second embodiment.

FIG. 8 is a block diagram showing an example of a function configuration of the image capturing parameter determination unit 701 in the present embodiment. Here, differences from the image correction unit 402 in the first embodiment are described.

By comparing with the image correction unit 402 of the first embodiment, the image capturing parameter determination unit 701 has an image capturing parameter correction unit 801 configured to correct the image capturing parameter used for image capturing of image data in place of the pixel value correction unit 508 configured to correct the pixel value of image data. The image capturing parameter correction unit 801 corrects the image capturing parameter so that the variation in the pixel value between image data is suppressed in the next image capturing based on the correction amount determined by the correction parameter determination unit 507. In a case where the correction amount is a coefficient that corrects luminance by multiplication, the image capturing parameter is modified so that the exposure changes by an amount corresponding to the correction amount. For example, in a case where the correction amount $C_n$ is calculated as equation (1), for exposure $E_n$ represented by the image capturing parameter, an image capturing parameter after correction $E'_n$ is calculated by equation (3).

$$E'_n = E_n \cdot C_n \quad (3)$$

Figure 9:
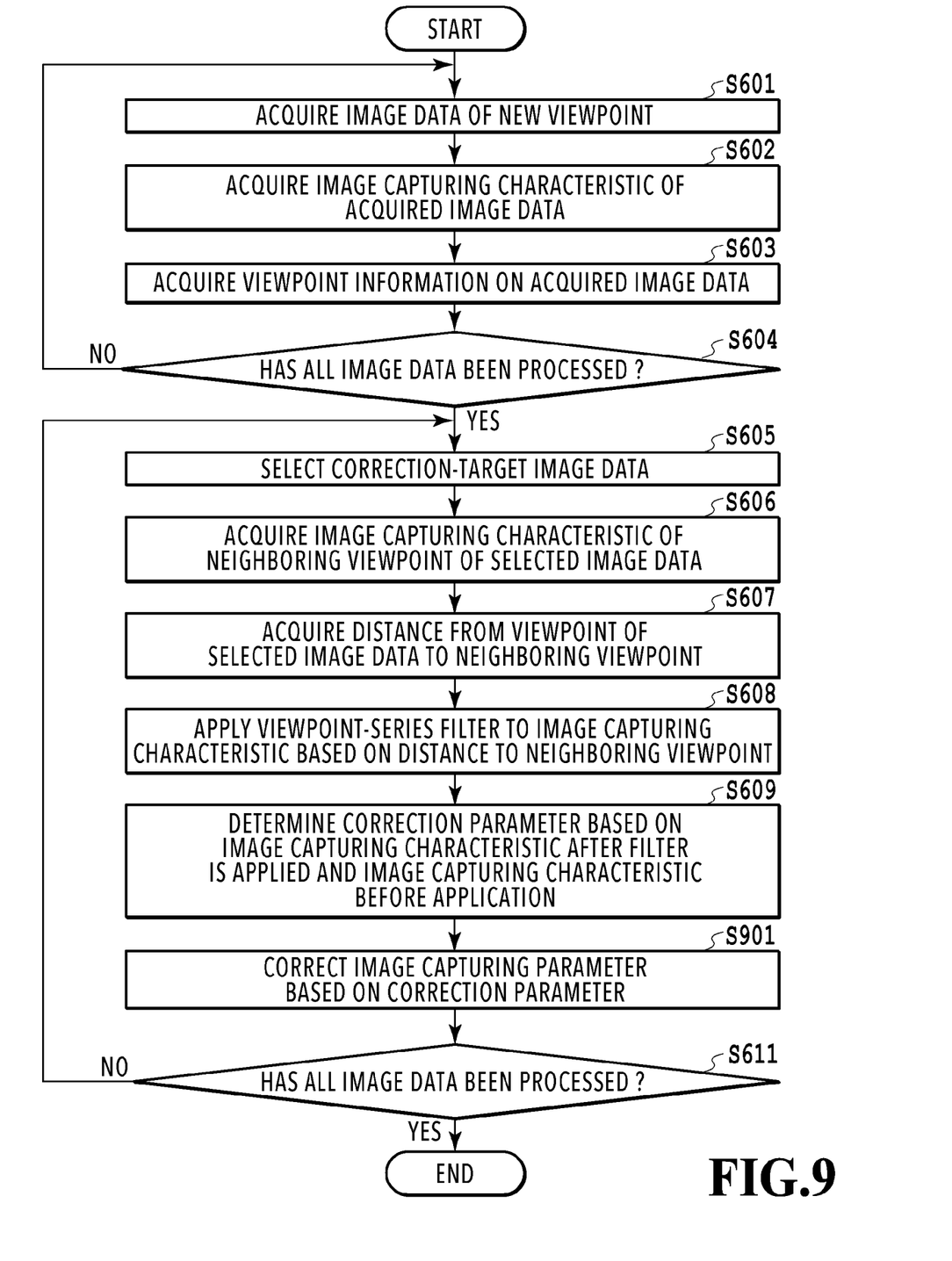
FIG. 9 is a flowchart of image capturing parameter determination processing by the image capturing parameter determination unit of the second embodiment.

FIG. 9 shows a flowchart of image capturing parameter determination processing by the image capturing parameter determination unit 701 of the present embodiment. The image capturing parameter determination processing in the present embodiment corresponds to the image correction processing in the first embodiment and here, differences from the flowchart in FIG. 6 in the first embodiment are described.

The image capturing parameter determination processing in the present embodiment includes S901 in place of S610 in the image correction processing of the first embodiment.

At S901, the image capturing parameter correction unit 801 corrects the image capturing parameter of the image data selected at S605 based on the correction parameter (correction amount) determined at S609. The image capturing parameter is stored in association with the image data. Correction of the image capturing parameter is performed as described previously with reference to equation (3). The image capturing parameter after correction is sent to the image capturing unit 401. The image capturing unit 401 captures an object by the image capturing apparatus 101 by using the image capturing parameter after correction and acquires the image data. By doing so, it is possible to acquire image data in which the variation in the pixel value between image data is suppressed.

As explained above, according to the present embodiment, it is possible to determine an image capturing parameter suitable to generation of the composed image data based on a plurality of pieces of image data by correcting the image capturing parameter based on the image data. Consequently, it is possible to acquire image data in which the variation in the pixel value is suppressed and suppress a reduction in image quality of the composed image data.

Figure 10:
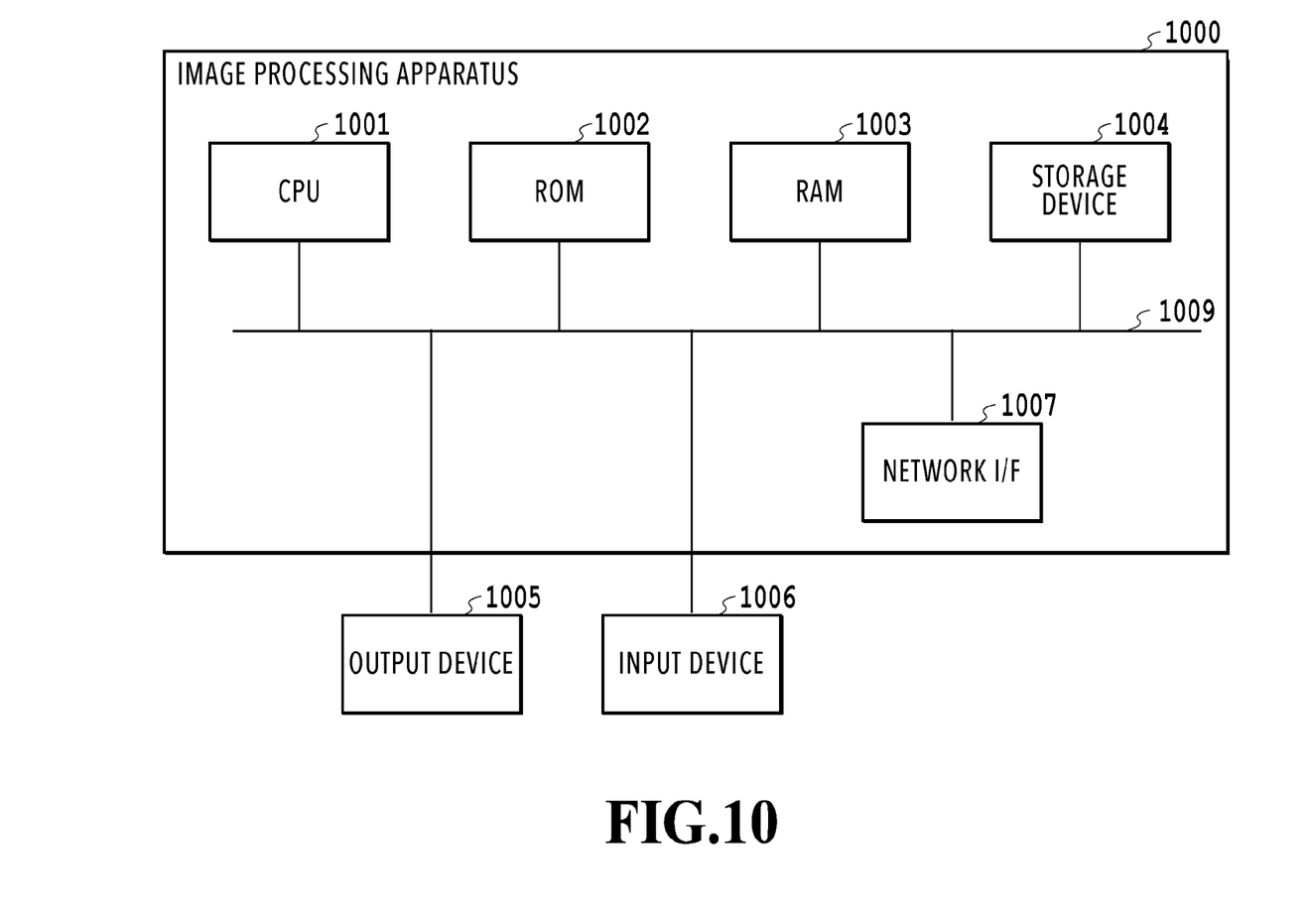
FIG. 10 is a diagram showing an example of a hardware configuration of the image processing apparatus in the first and second embodiments.

FIG. 10 shows a hardware configuration example of the image processing apparatus in the first and second embodiments described above.

An image processing apparatus 1000 has a CPU 1001, a ROM 1002, a RAM 1003, a storage device 1004, and a network I/F (interface) 1007. Each component is connected so as to be capable of communication with one another via a bus 1009. Further, to the image processing apparatus 1000, an output device 1005 and an input device 1006 are connected.

The CPU 1001 executes programs stored in the ROM 1002 or the storage device 1004 and centralizedly controls the image processing apparatus 1000. The ROM 1002 stores control programs of the image processing apparatus 1000. The RAM 1003 functions as a main memory in a case where the CPU 1001 executes programs and is used as a temporary storage area. The storage device 1004 is a storage medium, such as an HDD (Hard Disk Drive) and an SSD (Solid State Drive), and stores image data, various programs, and the like.

The output device 1005 is a display device, such as a liquid crystal display, and displays various kinds of setting information, image data, and the like. The input device 1006 is a mouse, a keyboard, a touch panel or the like and receives an input of various kinds of setting information from a user and operation instructions. The network I/F 1007 is an interface for performing communication with an external device via a network.

It may also be possible for the image processing apparatus 1000 to have one piece or a plurality of pieces of dedicated hardware different from the CPU 1001 or a GPU (Graphics Processing Unit). In such a case, it may also be possible for the GPU or dedicated hardware to perform at least part of the processing by the CPU 1001. As an example of dedicated hardware, there are an ASIC (Application Specific Integrated Circuit), a DSP (Digital Signal Processor), and the like.

As above, the hardware configuration of the image processing apparatus 1000 in the first and second embodiments is explained. but the hardware configuration is not limited to the configuration described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in composed image data generated from a plurality of pieces of image data based on image capturing from a plurality of viewpoints, it is possible to suppress a reduction in image quality of the composed image data.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-235667, filed Dec. 17, 2018 which is hereby incorporated by reference herein in its entirety.

What is claimed is:

1. An information processing apparatus comprising:
one or more memories storing instructions; and
one or more processors executing the instructions to:
(1) specify image capturing characteristics of images corresponding to a plurality of viewpoints from which is captured an object;
(2) perform smoothing processing for the specified image capturing characteristics;
(3) determine a correction parameter for correcting an image corresponding to a target viewpoint included in the plurality of viewpoints based on (a) an image capturing characteristic of the image corresponding to the target viewpoint before the smoothing processing is performed and (b) the image capturing characteristic of the image corresponding to the target viewpoint after the smoothing processing has been performed; and
(4) correct the image corresponding to the target viewpoint based on the determined correction parameter.

2. The information processing apparatus according to claim 1, wherein another viewpoint other than the target viewpoint is selected based on a distance from the target viewpoint calculated based on viewpoint information on the plurality of viewpoints.

3. The information processing apparatus according to claim 2, wherein the another viewpoint is a viewpoint whose distance from the target viewpoint is smaller than a predetermined value.

4. The information processing apparatus according to claim 1, wherein the smoothing processing is performed by applying a viewpoint-series low-pass filter to a first image capturing characteristic by using a second image capturing characteristic, and
wherein the correction parameter is determined based on (a) the first image capturing characteristic after the low-pass filter is applied and the (b) first image capturing characteristic before the low-pass filter is applied.

5. The information processing apparatus according to claim 4, wherein a coefficient of the low-pass filter is determined based on a distance between viewpoints.

6. The information processing apparatus according to claim 5, wherein the distance between viewpoints is determined based on viewpoint numbers allocated to the plurality of viewpoints.

7. The information processing apparatus according to claim 4, wherein the correction parameter is determined based on a ratio between the first image capturing characteristic after the low-pass filter is applied and the first image capturing characteristic before the low-pass filter is applied.

8. The information processing apparatus according to claim 1, wherein an image capturing characteristic is a representative value of luminance of the image data.

9. The information processing apparatus according to claim 8, wherein the representative value is an intermediate value, a mode, or an average value.

10. The information processing apparatus according to claim 1, wherein an image capturing characteristic is a white pixel value or a color temperature of the image data.

11. An information processing apparatus comprising:
one or more memories storing instructions; and
one or more processors executing the instructions to:
(1) specify image capturing characteristics of images corresponding to a plurality of viewpoints from which is captured an object;
(2) perform smoothing processing for the specified image capturing characteristics;
(3) determine a correction parameter for correcting an image capturing parameter of a target viewpoint included in the plurality of viewpoints based on (a) an image capturing characteristic of the image corresponding to the target viewpoint before the smoothing processing is performed and (b) the image capturing characteristic of the image corresponding to the target viewpoint after the smoothing processing has been performed; and
(4) correct an image capturing parameter of the target viewpoint based on the determined correction parameter.

12. The information processing apparatus according to claim 11, wherein another viewpoint other than the target viewpoint is selected based on a distance from the target viewpoint calculated based on viewpoint information on the plurality of viewpoints.

13. The information processing apparatus according to claim 11, wherein the smoothing processing is performed by applying a viewpoint-series low-pass filter to a first image capturing characteristic by using a second image capturing characteristic, and
wherein the correction parameter is determined based on (a) the first image capturing characteristic after the low-pass filter is applied and (b) the first image capturing characteristic before the low-pass filter is applied.

14. An information processing method, the method comprising the steps of:
   specifying image capturing characteristics of images corresponding to a plurality of viewpoints from which is captured an object;
   performing smoothing processing for the specified image capturing characteristics;
   determining a correction parameter for correcting an image corresponding to a target viewpoint included in the plurality of viewpoints based on (a) an image capturing characteristic of the image corresponding to the target viewpoint before the smoothing processing is performed and (b) the image capturing characteristic of the image corresponding to the target viewpoint after the smoothing processing has been performed; and
   correcting the image corresponding to the target viewpoint based on the determined correction parameter.

15. An information processing method, the method comprising the steps of:
   specifying image capturing characteristics of images corresponding to a plurality of viewpoints from which is captured an object;
   performing smoothing processing for the specified image capturing characteristics;
   determining a correction parameter for correcting an image capturing parameter of a target viewpoint included in the plurality of viewpoints based on (a) an image capturing characteristic of the image corresponding to the target viewpoint before the smoothing processing is performed and (b) the image capturing characteristic of the image corresponding to the target viewpoint after the smoothing processing has been performed; and
   correcting an image capturing parameter of the target viewpoint based on the determined correction parameter.

16. A non-transitory computer-readable storage medium storing a program for causing a computer to perform an information processing method, the method comprising the steps of:
   specifying image capturing characteristics of images corresponding to a plurality of viewpoints from which is captured an object;
   performing smoothing processing for the specified image capturing characteristics;
   determining a correction parameter for correcting an image corresponding to a target viewpoint included in the plurality of viewpoints based on (a) an image capturing characteristic of the image corresponding to the target viewpoint before the smoothing processing is performed and (b) the image capturing characteristic of the image corresponding to the target viewpoint after the smoothing processing has been performed; and
   correcting the image corresponding to the target viewpoint based on the determined correction parameter.

* * * * *